United States Patent
Funiciello

(10) Patent No.: US 8,016,721 B2
(45) Date of Patent: Sep. 13, 2011

(54) SEMIAUTOMATIC GEARBOX FOR VEHICLES

(75) Inventor: Luca Funiciello, Zanica (IT)

(73) Assignee: Starlane S.R.L., Albano S. Alessandro (IT)

( * ) Notice: Subject to any disclaimer, the term of this patent is extended or adjusted under 35 U.S.C. 154(b) by 653 days.

(21) Appl. No.: 12/161,020

(22) PCT Filed: Jan. 11, 2007

(86) PCT No.: PCT/EP2007/000202
§ 371 (c)(1),
(2), (4) Date: Jul. 16, 2008

(87) PCT Pub. No.: WO2007/082670
PCT Pub. Date: Jul. 26, 2007

(65) Prior Publication Data
US 2010/0154577 A1   Jun. 24, 2010

(30) Foreign Application Priority Data
Jan. 18, 2006  (IT) .............................. BG20060002 U

(51) Int. Cl.
*F16H 59/74* (2006.01)
*F16H 59/68* (2006.01)
*B60W 10/04* (2006.01)

(52) U.S. Cl. ............................ 477/101; 477/107; 74/335
(58) Field of Classification Search ................. 477/101, 477/102
See application file for complete search history.

(56) References Cited

U.S. PATENT DOCUMENTS

| | | | |
|---|---|---|---|
| 4,083,263 A | | 4/1978 | Lundquist |
| 4,973,274 A | * | 11/1990 | Hirukawa .......................... 440/1 |
| 5,665,025 A | * | 9/1997 | Katoh ............................. 477/107 |
| 2002/0046618 A1 | * | 4/2002 | Yamashita et al. ............... 74/335 |
| 2004/0162185 A1 | * | 8/2004 | Giefer et al. ................... 477/101 |

FOREIGN PATENT DOCUMENTS

| | | |
|---|---|---|
| DE | 40 13 299 | 11/1990 |
| DE | 295 00 639 | 4/1995 |
| DE | 298 12 605 | 10/1998 |
| EP | 0 424 883 | 5/1991 |
| GB | 914 669 | 1/1963 |

* cited by examiner

*Primary Examiner* — Edwin A Young
(74) *Attorney, Agent, or Firm* — Ladas & Parry LLP

(57) ABSTRACT

A semiautomatic vehicle gearbox comprising, for said gearbox, a shift lever (10) directly coupled to the gearbox itself; a shaft of said gearbox; and connection means between said shift lever and said shaft; characterised by comprising a sensor (20) for sensing the operation of said shift lever coupled to said connection means.

6 Claims, 1 Drawing Sheet

SEMIAUTOMATIC GEARBOX FOR VEHICLES

TECHNICAL FIELD

The present invention relates to a semiautomatic gearbox for vehicles, such as motorcycles, quads, go-karts and automobiles.

PRIOR ART

In vehicles the sequential or synchronized gear shift lever can be connected to the gearbox either directly or indirectly via linkages.

Passage from one gear to another is known to involve the following operations:
a) reducing the engine fuel feed,
b) operating the clutch,
c) engaging the gear,
d) releasing the clutch,
e) returning engine fuel feed to the required level.

This succession of operations, especially during fast running, has a negative influence both on the smoothness of vehicle running and on the running behaviour of the vehicle, which can lead to dangerous instability, together with a loss of performance. Utility model application MI2022U000396 filed in the name of the present applicant describes a motorcycle gear shift lever directly coupled to the gearbox itself, characterised by comprising at least one extensimeter positioned on the lever. By means of an electronic circuit the extensimeter is able to interrupt the current feed to the spark plug or plugs in response to the operation of the gear shift lever. In this manner the gear can be changed without the need to operate the clutch and reduce fuel feed.

DISCLOSURE OF THE INVENTION

An object of the present invention is to provide a semiautomatic vehicle gearbox of simpler construction and reduced costs.

This and further objects are attained according to the present invention by a semiautomatic vehicle gearbox comprising, for said gearbox, a shift lever directly coupled to the gearbox itself; a shaft of said gearbox; and connection means between said shift lever and said shaft; characterised by comprising a sensor for sensing the operation of said shift lever coupled to said connection means.

Further characteristics of the invention are described in the dependent claims.

According to the present invention, a semiautomatic gearbox can be provided without replacing the gear shift lever, but merely by modifying the coupling means between the lever and the gearbox shaft.

The coupling means normally consist of a bolt, it therefore being sufficient to add an extensimetric system (washer-shaped load cell) to the bolt, or to replace the bolt (or fixing nut) with one provided with an extensimetric system. The extensimetric system is then connected to an electronic control unit connected to the vehicle electrical system in order to interrupt or reduce the engine torque and hence be able to change gear without the need to operate the clutch and reduce the fuel feed.

Advantageously, this modification can be made for all types of vehicles provided with a mechanical ratio gearbox.

BRIEF DESCRIPTION OF THE DRAWINGS

The characteristics and the advantages of the present invention will be apparent from the ensuing detailed description of one embodiment thereof illustrated by way of non-limiting example in the accompanying drawings, in which.

BEST MODE FOR CARRYING OUT THE INVENTION

Figure 1:
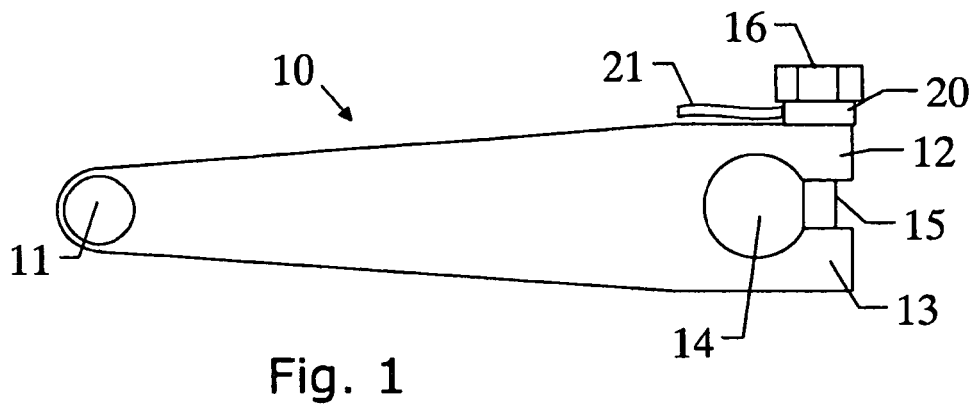
FIG. 1 is schematic side view of a lever directly coupled to the gearbox.
Figure 2:
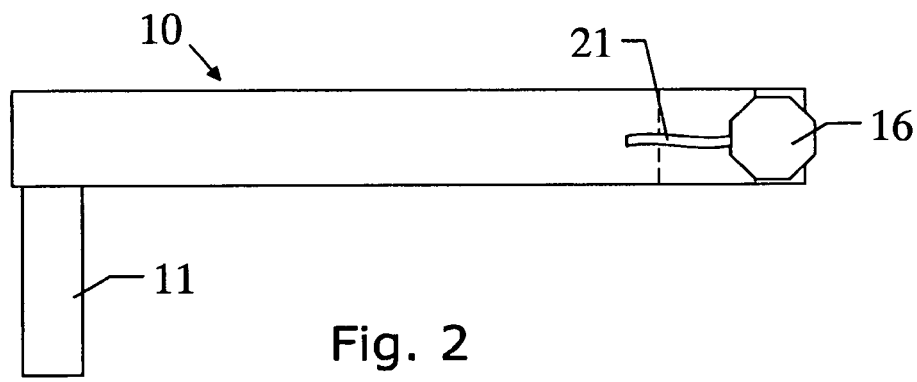
FIG. 2 is a schematic view, taken from above, of a lever directly coupled to the gearbox.
Figure 3:
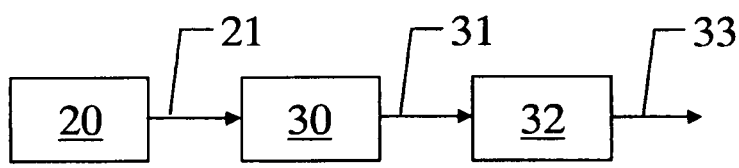
FIG. 3 is a block diagram relative to the engine electrical feed control.

With reference to the accompanying figures, an embodiment of a semiautomatic vehicle gearbox according to the invention, in particular for motorcycles, comprises a shift lever 10 having a pedal crank 11 at one end.

At its opposite end the lever 10 is divided into two opposing portions 12 and 13. The two portions 12 and 13 are arranged to form a circular housing 14 to accommodate the shaft of the vehicle gearbox (not to shown).

The inner surface of the circular housing 14 is normally finished with knurling to engage corresponding knurling on the gearbox shaft.

To securely fix the gearbox shaft to the shift lever 10 a hole is provided through the portions 12 and 13 to accommodate a bolt 15 with a fixing head 16. When tightened, this bolt 15 tends to force the two portions 12 and 13 together about the gearbox shaft and hence clamp the two portions 12 and 13 against the shaft.

According to the present invention a sensor 20 in the form of a washer is positioned between the head 16 and one of the portions 12 and 13 to sense mechanical deformations. An electric cable extends from the sensor 20 for connection to a control unit 30.

The sensor 20 used is a load cell, for example model FMT-6 marketed by the company FGPSensor Sari.

Figure 4:
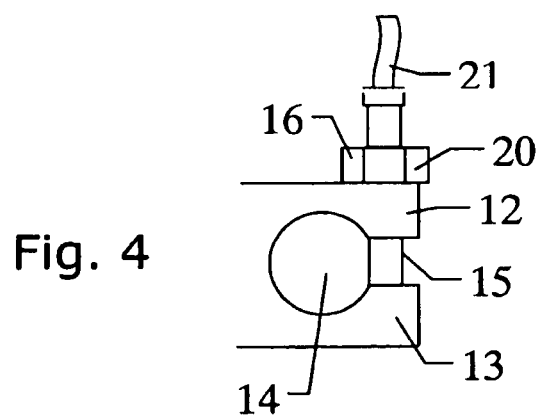
FIG. 4 is a schematic side view of a portion of a variant of a lever directly coupled to the gearbox.

As an alternative to the washer-shaped sensor 20, other types of sensor can be used for application to the bolt 15, for example a bolt head comprising an extensimetric system, as in FIG. 4, or other sensors provided with at least one extensimeter for measuring the variation in distance between the two portions 12 and 13.

As an alternative to an extensimetric sensor 20 other types of sensor can be used, for example a piezoelectric sensor.

The central control unit 30 is connected electrically by a cable 31 to the vehicle electrical/electronic circuits 32 which feed the spark plugs (not shown) via a cable 33.

The figures and the present description refer to a lever 10 operable by the driver via the pedal crank 11 and connected directly to the vehicle shaft. The present invention is also applicable to all gearboxes which in addition to the lever 10 also comprise linkages connecting a pedal crank or gear operating means to the gearbox shaft. This is due to the fact that the invention relates in particular to the coupling means between a lever and the gearbox shaft.

When a vehicle gear change is required, the driver operates a gear shift lever directly or indirectly connected to the gearbox shaft. This action by the driver subjects the two portions 12 and 13 to a force which tends to vary the distance between them. This force is measured by the sensor 20 and its value is acquired by the central control unit 30 which shuts off electrical feed to the spark plug or plugs by means of the electrical/electronic circuits 32.

The central control unit 30 amplifies the signal from the sensor 20 and acts on the engine operating system to enable the gear to be engaged without operating the clutch or even minimally releasing the accelerator.

The said electronic circuit can act in various ways on the motorcycle operation to interrupt or reduce the engine torque in addition to interrupting electrical feed to the spark plugs. In particular, injector feed can be interrupted or a particular channel of the engine central control unit dedicated to this function can be acted upon, or the engine shut-off switch can be operated.

The central control unit 30 can also be regulated to suitably choose the intervention threshold voltage beyond which gear change must take place.

The central control unit 30 is not further described as its construction is known to an expert of the art.

The fact that the sensor 20 is directly associated with the bolt 15 used to connect the lever to the gearbox shaft, in accordance with the present invention, makes the device virtually universal, i.e. suitable for any type of vehicle having a lever connected to the shaft axis, such as motorcycles, quads, go-karts and automobiles.

The constructional costs are also low compared with similar devices on the market.

The system conceived in this manner is susceptible to numerous modifications and variants, all falling within the scope of the inventive concept; moreover all details can be replaced by technically equivalent elements.

The invention claimed is:

1. A semiautomatic vehicle gearbox comprising, for said gearbox, a shift lever directly coupled to the gearbox itself; a shaft of said gearbox; and connection means between said shift lever and said shaft; further comprising a sensor for sensing the operation of said shift lever coupled to said connection means; said shift lever is divided at one end into two opposing portions to be connected to said shaft, said connection means comprising a bolt enabling said two portions and said shaft to be fixed together; characterised in that said sensor is coupled to said bolt, and measures the variation in the distance between said two opposing portions.

2. A semiautomatic vehicle gearbox as claimed in claim 1, characterised in that said sensor comprises at least one extensimeter.

3. A semiautomatic vehicle gearbox as claimed in claim 1, characterised in that said sensor is of washer shape.

4. A semiautomatic vehicle gearbox as claimed in claim 1, characterised in that said sensor is of button shape.

5. A semiautomatic vehicle gearbox as claimed in claim 1, characterised by comprising, connected to said sensor, a control circuit able to interrupt or reduce the engine torque in response to the operation of said gear shift lever.

6. A semiautomatic vehicle gearbox as claimed in claim 1, characterised by comprising, connected to said sensor, a control circuit able to interrupt electrical feed to the vehicle spark plug or plugs.

* * * * *